F. TOTH.
HORSE FEEDING BAG.
APPLICATION FILED AUG. 18, 1911.
1,011,674.
Patented Dec. 12, 1911.
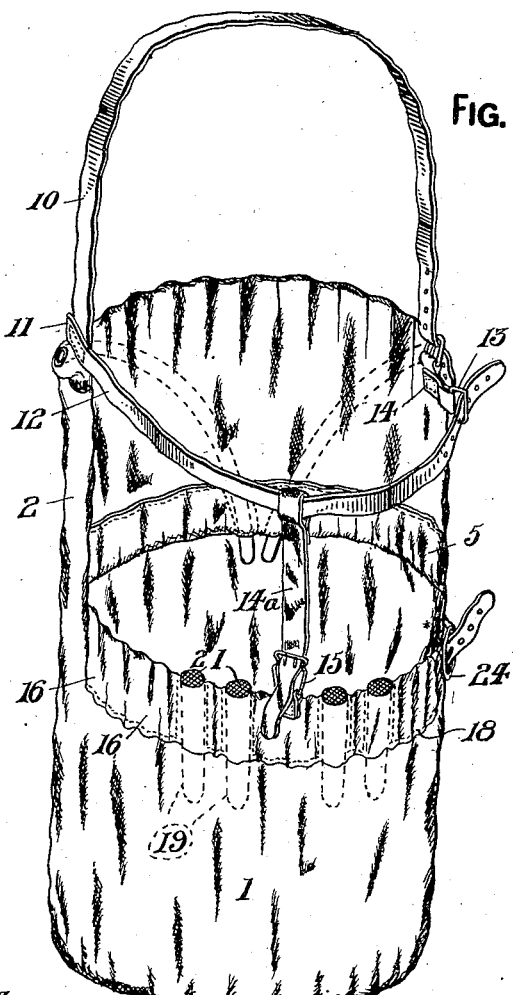
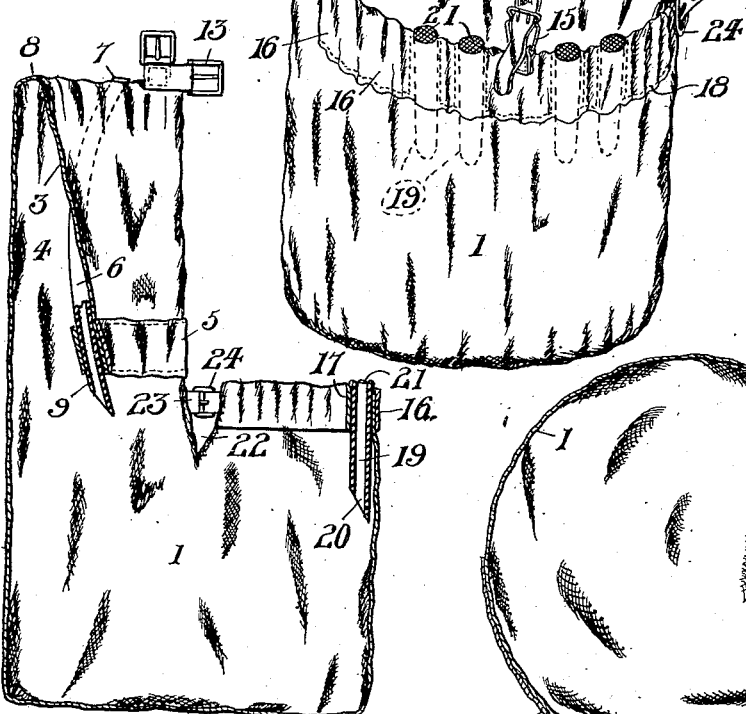
WITNESSES:
INVENTOR.
F. Toth
BY
ATTORNEYS.
COLUMBIA PLANOGRAPH CO., WASHINGTON, D. C.

UNITED STATES PATENT OFFICE.

FERENCZ TOTH, OF ZANESVILLE, OHIO.

HORSE FEEDING-BAG.

1,011,674.        Specification of Letters Patent.      Patented Dec. 12, 1911.

Application filed August 18, 1911. Serial No. 644,746.

*To all whom it may concern:*

Be it known that I, FERENCZ TOTH, citizen of the United States of America, residing at Zanesville, in the county of Muskingum and State of Ohio, have invented certain new and useful Improvements in Horse Feeding-Bags, of which the following is a specification, reference being had therein to the accompanying drawing.

This invention relates to feed bags for animals, more particularly adapted for horses, and has for its object to provide feed bag in a manner as hereinafter set forth with ventilating means, so that the interior of the bag will be ventilated when the animal is eating.

Further objects of the invention are to provide a ventilated feed bag which is comparatively simple in its construction and arrangement, strong, durable, efficient in its use, readily connected to the horse's head and comparatively inexpensive to manufacture.

With the foregoing and other objects in view, the invention consists of the novel construction, combination and arrangement of parts, as hereinafter more specifically described and illustrated in the accompanying drawing, wherein is shown an embodiment of the invention, but it is to be understood that changes, variations and modifications can be resorted to which fall within the scope of the claim hereunto appended.

In describing the invention in detail reference is had to accompanying drawings, wherein like reference characters denote corresponding parts throughout the several views, and in which—

Figure 1 is a perspective view of ventilating feed bag in accordance with this invention. Fig. 2 is a longitudinal sectional view. Fig. 3 is a sectional plan.

Referring to the drawings in detail 1 denotes a flexible body portion formed of suitable material and provided with semicylindrical extension 2, bent upon itself to provide a depending flap 3, and to further provide a pocket 4, opening into lower part of the body portion. The flap 3 is reinforced by stay pieces 5 at its lower end and which constitute means for coupling to said lower end a pair of ventilating tubes 6 which project as at 7 through the bend 8, and open into the atmosphere. The lower terminus of each of the tubes 6 depends below the lower end of the flap 3, and opens into the upper part of the body portion 1 as at 9.

Secured to each of the upper corners of the extension 2 is a vertically disposed strap 10, for supporting the bag from the horse's head and connected to near one end of the strap 10, is one end 11 of a strap 12, which is adapted to extend around one side of the horse's head and be connected to a buckle 13 carried by a loop 14 secured to the extension 2 near its upper end. Slidably mounted upon and depending from the strap 12, is a vertically disposed strap 14$^a$, which is adapted to be connected to a buckle 15 at the top of the body portion 1. The straps 10, 12 and 15 are used for securing the bag in position upon the horse's head.

Mounted upon the top edge of the body portion 1 is a pair of stay pieces 16, 17 which are secured in position by a row of stitches 18. The pieces 16 17 couple to the body portion 1, a series of vertically disposed ventilating tubes 19, which open as at 20 into the body portion and communicate at their upper ends with the atmosphere. The upper ends of each of the tubes 19, is provided with a screen 21, to prevent the feed or foreign bodies entering through the tubes into the body portion. One side of the body portion, at its top is formed with a V-shaped slit 22 to provide the contracting of the top of the body portion around the horse's head. A strap 23 is connected at one end to the body portion and is adapted to engage a buckle 24, and by this arrangement, the body portion can be tightly secured around the horse's head when the strap and buckle are connected to prevent accidental spilling of the contents of the bag.

What I claim is:—

A feed bag comprising a cylindrical body portion providing a vertically disposed semicylindrical extension forming a pocket, and a pair of ventilating tubes extending through said pocket and opening into and on the outside of the body portion of the bag.

In testimony whereof I affix my signature in the presence of two witnesses.

FERENCZ TOTH.

Witnesses:
     MEZEY ISTVAN,
     RAZALYI ISTVAN.

Copies of this patent may be obtained for five cents each, by addressing the "Commissioner of Patents, Washington, D. C."